Sept. 20, 1971    W. F. BURKE ET AL    3,605,973
COIN-ACTUATED FLUID-DISPENSING SYSTEM WITH SEPARATE
REGISTERS FOR COINS RECEIVED AND FLUID DISPENSED
Filed Oct. 21, 1969    4 Sheets-Sheet 1

INVENTORS
WILLIAM F. BURKE,
HARRY R. ROTHSCHILD, &
ROBERT B. YOUNG

BY THEIR ATTORNEYS
HARRIS, KIECH, RUSSELL & KERN

United States Patent Office 3,605,973
Patented Sept. 20, 1971

3,605,973
COIN-ACTUATED FLUID-DISPENSING SYSTEM WITH SEPARATE REGISTERS FOR COINS RECEIVED AND FLUID DISPENSED
William F. Burke, Westminster, Harry R. Rothschild, Santa Fe Springs, and Robert B. Young, Littlerock, Calif., assignors to Pan-Nova, Inc., Santa Fe Springs, Calif.
Filed Oct. 21, 1969, Ser. No. 868,088
Int. Cl. G07f *13/00*
U.S. Cl. 194—13    12 Claims

ABSTRACT OF THE DISCLOSURE

A coin-operated system for use with conventional gasoline pumping units for coin-operated dispensing. A system which accepts a variable amount of initial payment, dispenses the full amount of gasoline paid for or any portion thereof, and pays out the exact change to the customer. A system which operates in larger monetary units at a relatively high rate while dispensing gasoline and which operates in smaller monetary units at a relatively low rate while paying out exact change to the penny.

---

This invention relates to coin-operated fluid-dispensing systems and will be described herein as used in a gasoline pumping unit for an automobile service station. However, it will be readily recognized that the system of the invention can be utilized for dispensing other fluids in other environments.

The conventional gasoline delivery unit includes a pump, a flow meter or computer which indicates the amount delivered in gallons and dollars, an outlet nozzle, a pump control switch actuated by the attendant when the nozzle is removed and replaced, and a lever for resetting the flow meter to zero. Some gasoline pumping units are designed for receiving money and dispensing the amount of gasoline paid for. These units incorporate one or two flow control valves to give a full flow and a slow flow performance, electrical solenoids for opening and closing the valves to terminate gasoline delivery when the deposited money is used up, and an electrically operated mechanism for resetting the flow meter. One such apparatus is Tokheim Model 1150T-S-RC-APC gasoline dispenser. The specific embodiment described herein incorporates this particular model, but it will be recognized that other dispensers can be utilized and can be modified to incorporate the additional features of the particular model identified herein.

Gasoline dispensers which accept some form of prepayment and which shut off the dispensing operation when the payment is used up are known in the art, and one such device is described in the copending application for United States patent Ser. No. 755,998 filed Aug. 28, 1968, now Patent No. 3,550,743, and assigned to the same assignee as the present application. Various problems have been encountered in the prior art devices. Sometimes an automobile could not receive all of the gasoline paid for or all of a predetermined portion of the gasoline paid for. This could occur because the automatic shut-off on the nozzle would not accept more or because the customer has topped off the tank. This required some refund operation which complicated the handling of the transaction and reduced the expected efficiency of the prepayment scheme. Another problem arose with modifications to standard units which required the approval of governmental weights and measures inspectors and/or Underwriter's Laboratory and similar organizations.

It is an object of the present invention to provide a new and improved coin-operated fluid-dispensing system and in particular, a system which will automatically pay out the exact change, to the penny, to the customer after dispensing of gasoline has stopped at any time and for any reason. It is a further object to provide such a system which can have a variable input in terms of money or tokens or the like, which can dispense a variable amount of gasoline depending upon the capacity of the container, the amount of money paid in, the customer's desire or the customer's whim, and can make the exact change automatically at the end of the operating cycle.

The system of the invention is basically self-contained and requires very little modification of existing units, typically the provision of a shaft connection with the flow meter and some electrical connections at existing terminals. The system may be designed to receive money, tokens or other indicia or electrical signals indicating the amount paid for or the maximum amount to be dispensed. The system may also provide a visual display of the amount paid for and with the automatic pay-out of exact change induces customer confidence in the equipment.

The system may accept payment in large units such as dollars or quarters and may dispense gasoline in large units at a relatively high rate. At the same time, the system provides for pay-out of change in a minimum coinage unit, typically pennies, at a relatively slow rate. This permits high accuracy and reliability in the small increment pay-out and fast operation in the large increment dispensing step. In the embodiment illustrated, the measure of the amount dispensed and the amount due for change is achieved by seeking a match between two registering units and preferably incorporates non-energized contacts providing a fail-safe type of operation. This identification of the match also provides information which can be used for recording sales, paying out trading stamps, and the like as well as for change pay-out.

The invention also comprises novel details of construction and novel combinations and arrangements of parts, which will more fully appear in the course of the following description, wherein the drawings merely show and the description merely describes a preferred embodiment of the present invention which is given by way of illustration or example.

Figures 1, 2, 3, 6, 7:
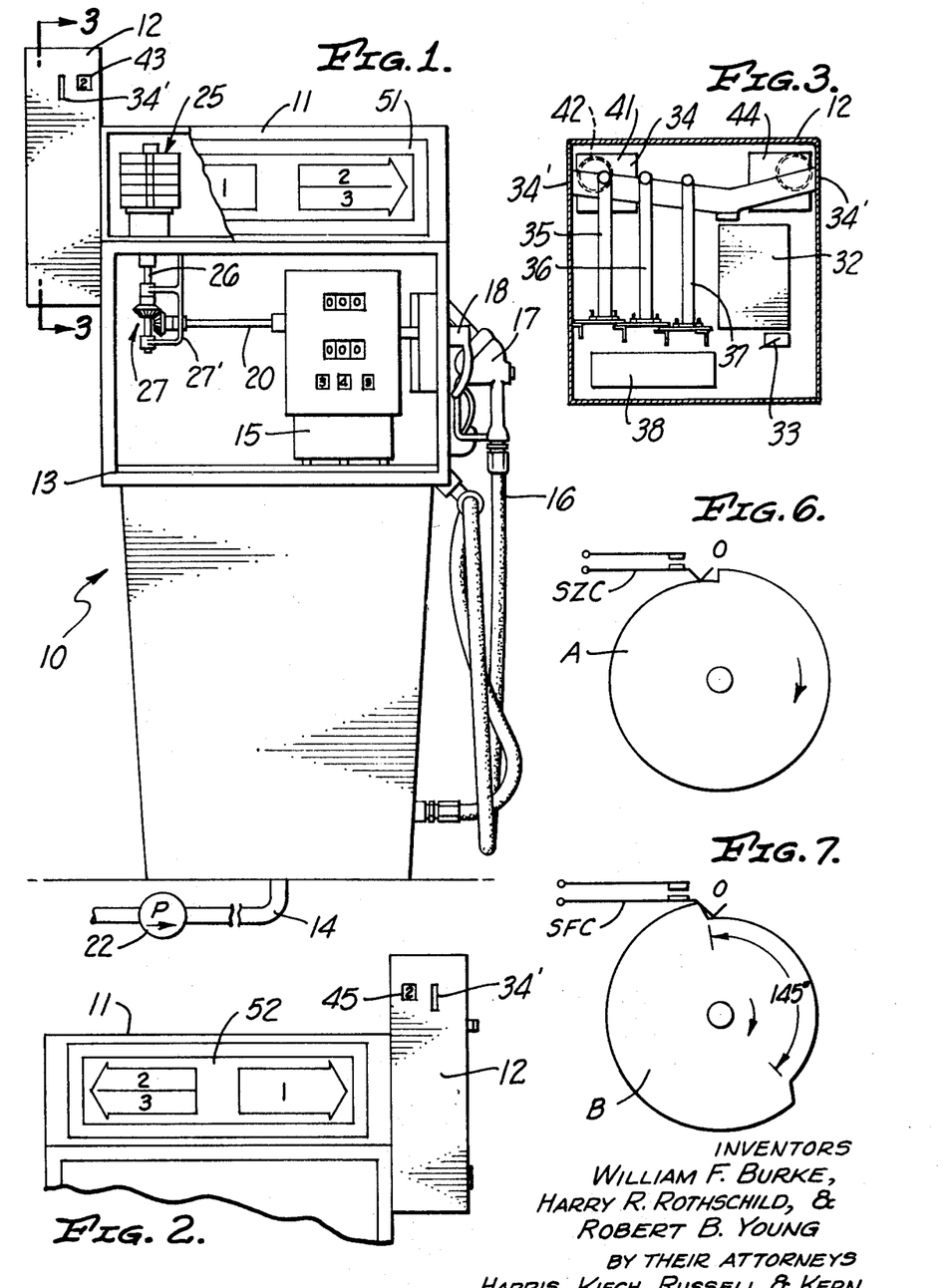
FIG. 1 is a side view of a gasoline pumping unit incorporating a preferred embodiment of the present invention, with portions of the side panels of the housing removed.
FIG. 2 is a partial view of the unit of FIG. 1 from the opposite side.
FIG. 3 is a partial sectional view taken along the line 3—3 of FIG. 1 illustrating the money-handling portion of the unit.
FIGS. 6, 7, 8 and 9 illustrate cams A, B, C and D, respectively, of the resolution unit of FIG. 5.
Figure 4A:
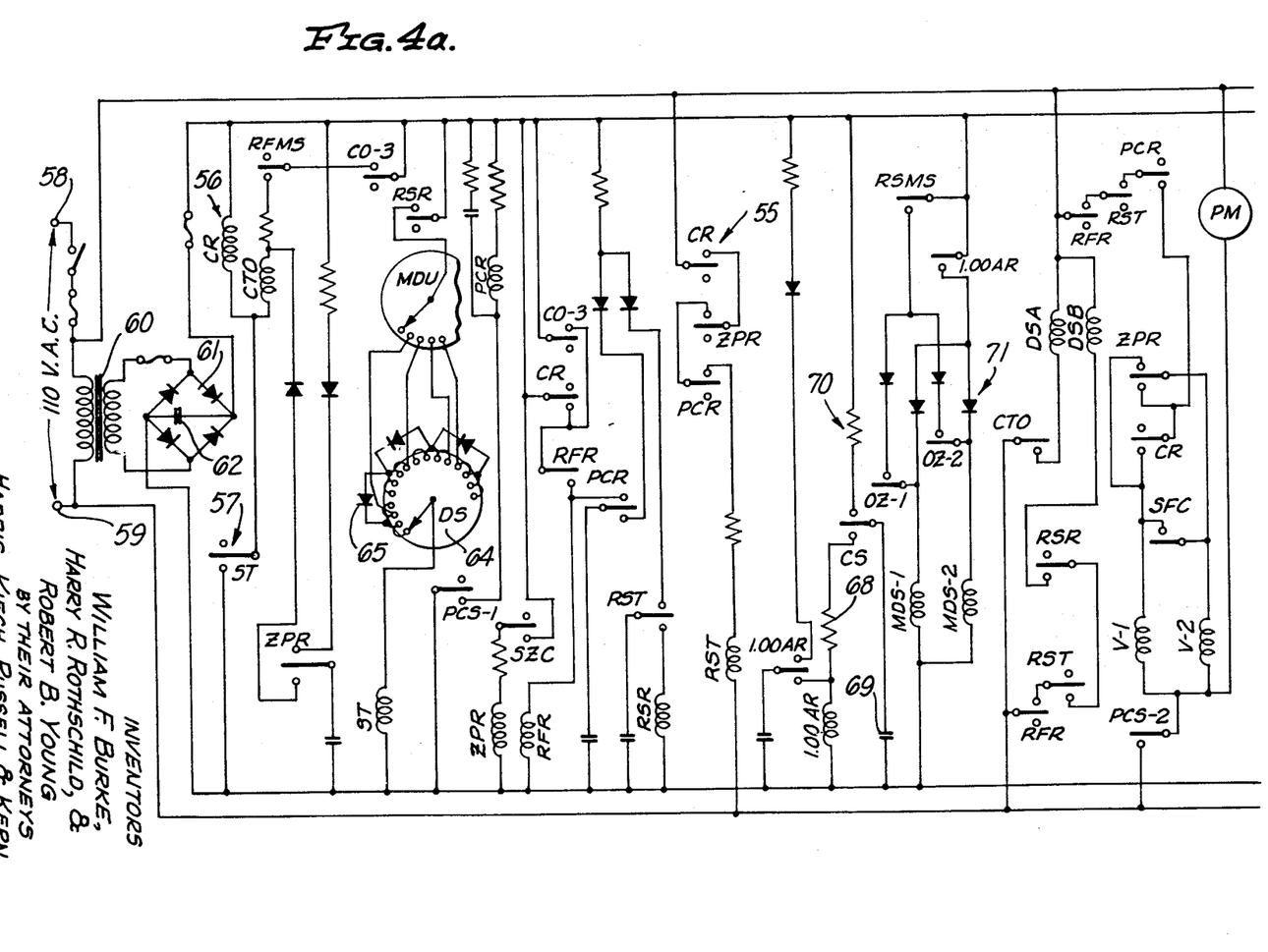
FIGS. 4a and 4b comprise an electrical schematic of the unit of FIG. 1.
Figure 4B:
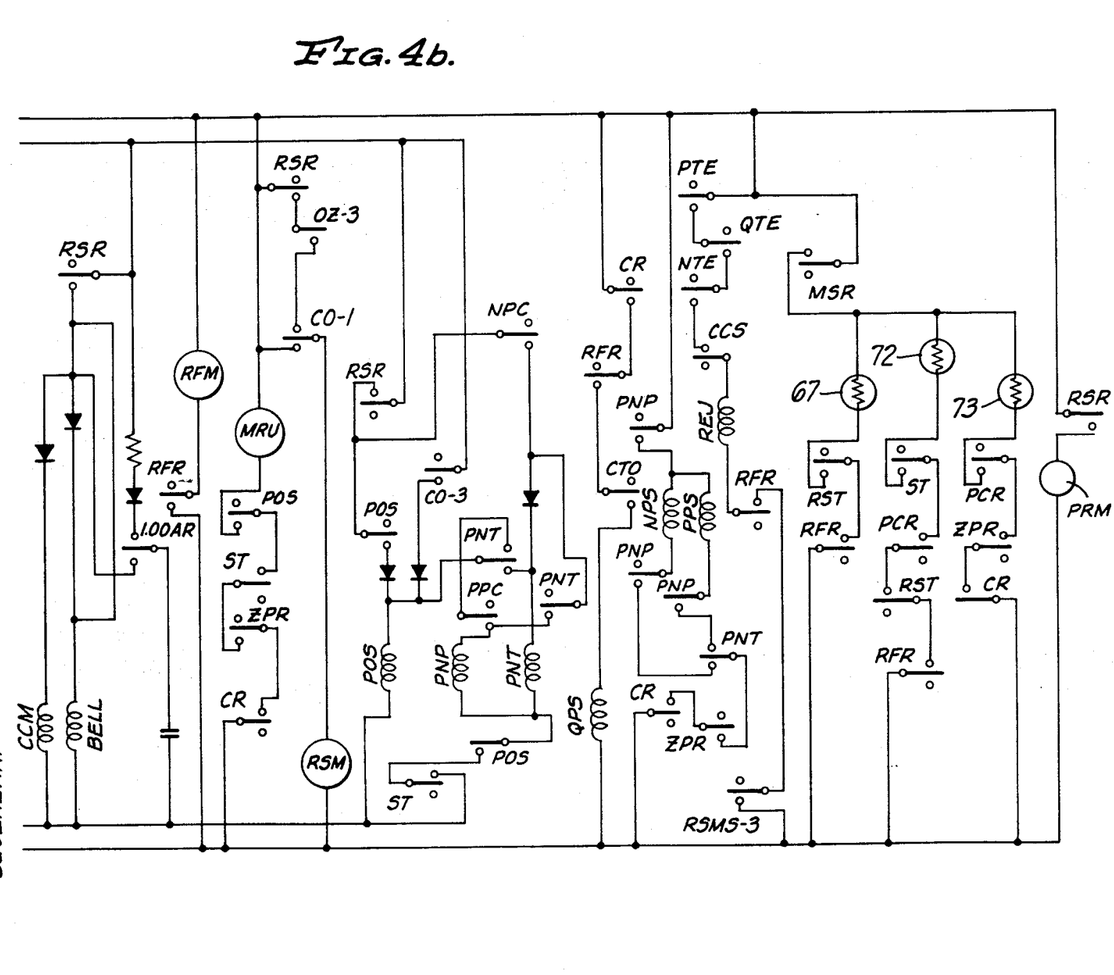
Figures 5, 8, 9:
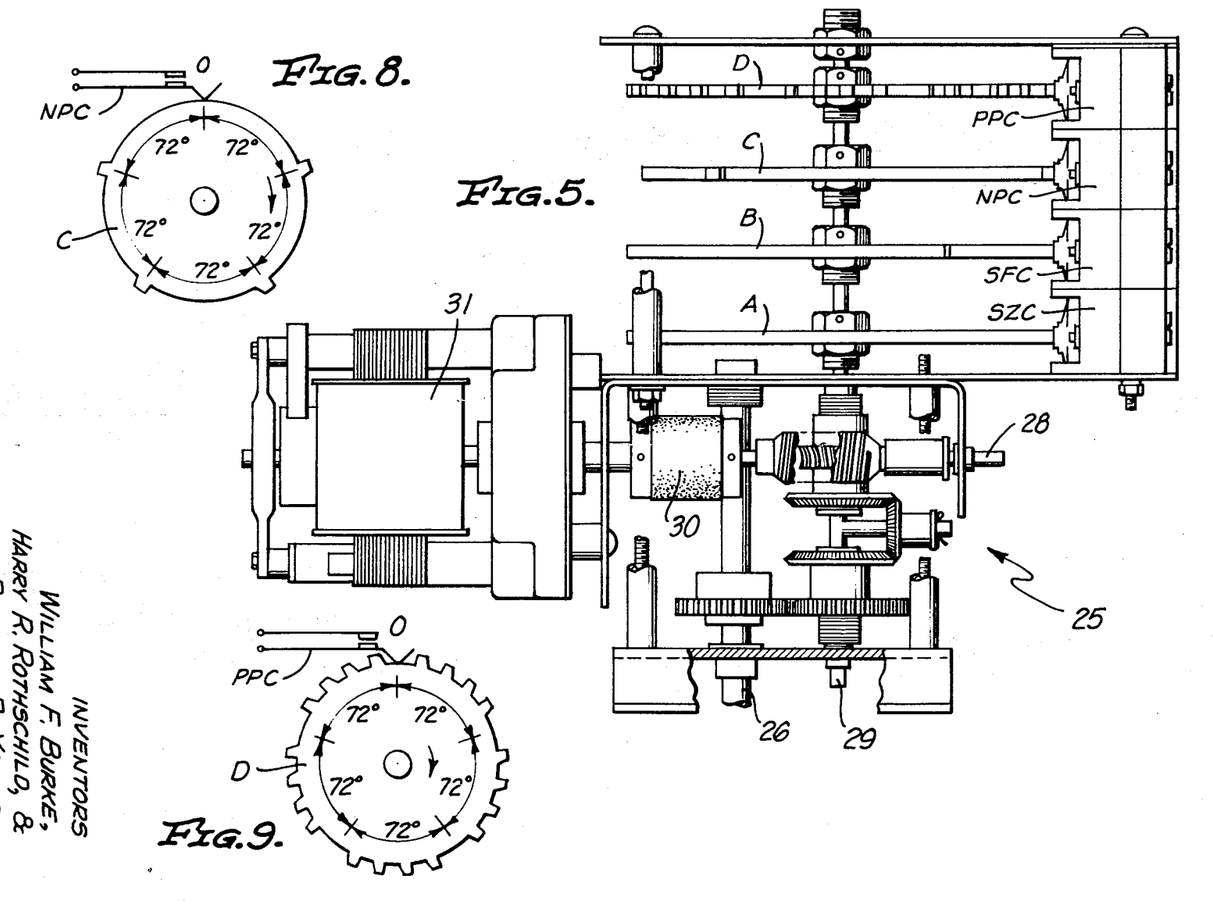
FIG. 5 is an enlarged side view of the resolution unit of the structure of FIG. 1.

The structure of FIG. 1 includes a gasoline delivery unit 10 (Tokheim Model 1150T-S-RC-APC) to which the coin-operated dispensing system has been attached, with the system contained in housings 11, 12. A side panel has been removed from the housing 13 of the gasoline delivery unit 10 to show some of the interior connections. The delivery unit 10 includes an inlet pipeline 14, a flow meter or computer 15, hose 16 and outlet nozzle 17, and a lever 18 for operating switches designated as pump control switch No. 1 and No. 2, PCS-1 and PCS-2. The flow meter 15 provides for measuring the amount of gasoline flowing from the nozzle 17 and indicates the measured amount in gallons and in dollars and cents. A dispenser reset motor DRM is incorporated in the flow meter 15 for resetting the mechanism to the zero condition. A shaft 20 projects from the side of the flow meter 15 and makes one complete revolution for each ten-cent increment of fluid dispensed. Two valves are connected in parallel between the inlet pipeline 14 and the hose 16 for controlling fluid flow from the pump to the outlet nozzle, with the valves being controlled by valve solenoids No. 1 and No. 2, V1 and V2. When both valves are closed, there is no flow; when both valves are opened, there is fluid flow at the maximum or full rate; when one valve is open and one valve is closed, there is flow at an intermediate or slow flow rate. In a typical installation, the two valves will be of equal size so that the slow flow rate is one-half the full flow rate. There is a pump 22 in the inlet pipeline 14, with the pump usually being positioned remote from the delivery unit. The pump motor PM is energized in the conventional manner via PCS–2. Each delivery unit may have its own pump motor, or one pump motor may serve several delivery units. The electrical circuitry is shown in FIG. 4 and will be discussed below.

A resolution unit 25 is mounted in the housing 11 and has one input shaft 26 connected to the flow meter shaft 20 by a right angle gear drive 27 supported on a bracket 27'. The resolution unit 25 is illustrated in FIGS. 5–9 and includes a differential type arrangement of gears with inputs 26, 28 and an output 29. An electric motor 31 (MRU) has its output shaft connected to the input shaft 28 by flexible coupling 30. In the particular embodiment illustrated, the gear ratios are selected such that 2½ revolutions of the 10 cent shaft 20 from the flow meter produces one revolution of the output shaft 29. The gearing is also arranged so that the motor MRU drives the output shaft 29 in the same direction as the output shaft is driven by the flow meter.

Four cams A, B, C and D (FIGS. 6–9) are mounted on the output shaft 29 for actuating the subtract and zero position switch SZC, the slow flow switch SFC, the nickel pay-out switch NPC, and the penny pay-out switch PPC, respectively, as the shaft 29 rotates. As can be seen from the cam configurations in FIGS. 6–9, cam A activates switch SZC once for each complete revolution, cam B activates switch SFC once per revolution with the opening of SFC preceding the opening of SZC by approximately 145°. Cam C activates switch NPC at ⅕, ⅖, ⅗ and ⅘ of a revolution. Cam D activates switch PPC 20 times per revolution, with the switch being closed every 14.4° of a revolution except at the points when switch NPC is closed and at the zero point. With the particular embodiment illustrated, one revolution of the shaft 29 corresponds to one delivery unit of gasoline having a value of 25 cents. Cam A provides a zero position indicating the start and end of a delivery unit. Cam B is utilized to initiate the slow flow operation by closing one of the valves approximately midway through a delivery unit. Cam C provides signals corresponding to 5 cents, 10 cents, 15 cents and 20 cents, while cam D provides signals for the odd cents between the 5-cent signals of cam C. Of course, other cam configurations can be utilized for other values for delivery units and for other monetary values.

The coin handling units are mounted in the housing 12 and are shown in FIG. 3. A conventional coin acceptance unit 32 is fed by coin chutes 34 leading from coin slots 34' located on opposite sides of the housing 12. The coin acceptance unit 32 functions in the conventional manner to close a coin switch 33 (CS) when a valid coin has been received. The acceptance unit 32 also includes a coin reject solenoid COR for rejecting undesired coins. A coin count switch CCS is positioned elsewhere in the system to energize the coin reject solenoid when more than a predetermined number of coins are deposited at one time.

The particular embodiment illustrated and described in this application is designed for operation with tokens representing one dollar in value. Of course the system can be designed to handle any type of coin or token and the word coin is used here to include any of the objects representing monetary value.

A coin refund unit is also mounted in the housing 12 and includes quarter, nickel, and penny storage tubes 35, 36, 37, respectively. The quarter tube 35 includes a mechanism for dropping quarters one at a time into pay-out receptacle 38, operated by the quarter pay-out solenoid QPS, and also includes a switch QTE operated when the quarter tube is empty. The nickel tube 36 and the penny tube 37 are similarly equipped with a nickel pay-out solenoid NPS and the tube empty switch NTE and a penny pay-out solenoid PPS and tube empty switch PTE, respectively.

A monetary display unit 41 is mounted in the housing 12 and includes a wheel 42 having the numerals 0 through 9 positioned around the periphery thereof. The wheel is disposed within the housing so that one of the numerals may be viewed through an opening 43 in the housing 12 (FIG. 1). The display unit is stepped through the ten positions by a monetary display solenoid, MDS–1. A similar display unit 44 is positioned in the housing 12 for displaying numerals at a window 45 (FIG. 2) and is operated by another solenoid MDS–2. The units 41, 44 display the number of one-dollar tokens which a customer deposits and are reset to zero when the system is reset. The units typically are solenoid-operated stepper devices of conventional design and it will be recognized that other numerical display devices can be utilized where desired.

Display panels 51, 52 are mounted on opposite sides of the housing 11 and each is provided with three legends identified by numerals 1, 2 and 3, and with lamps for selectively illuminating the legends. The preferred language for each of the legends is set out in Table II. Legend 1 may be presented in the form of an arrow pointing toward coin slots 32. Legends 2 and 3 may be provided in the form of an arrow pointing toward the nozzle 17 and the lever 18. Typically the lever 18 is painted red for ease in location.

The electrical circuitry for the system is illustrated in FIGS. 4a and 4b, and the various components are identified in Table I.

Most of the components are switches, relay coils, relay contacts, solenoid coils, motors, lamps, resistors, diodes and capacitors and are conventional in construction and operation. By way of example, reference numeral 55 indicates a set of contacts of the credit relay CR and reference numeral 56 indicates the coil of the CR relay. The moving arm of the contact set 55 engages the upper fixed contact when the coil is unenergized and engages the lower fixed contact when the coil is energized. The coil for the credit relay CR is energized when the stop relay ST is energized, closing contact set 57.

The system is powdered from a 110 volt A.C. source connected at terminals 58, 59. A voltage step-down transformer 60, a full wave rectifier 61, and a filter capacitor 62 provide a 24 volt D.C. power source for some of the components.

The system includes a counter, typically a solenoid actuated stepping switch 64, referred to as the delivery stepper DS. The delivery stepper has a plurality of fixed contacts and a moving arm which is advanced from one contact to the next. In the system described in this application, 36 contacts are utilized, although only a portion of the contacts are illustrated in FIG. 4. Each step corresponds to one delivery unit of 25 cents and 36 contacts provide a nine dollar capacity for the system. The delivery stepper is actuated by solenoids DSA and DSB. When DSA is energized, the stepper switch advances one step. When DSB is energized, the stepper switch is reset to the initial condition, as illustrated in FIG. 4. Contacts 1 through 4 are electrically interconnected. Contacts 5 through 8 are similarly interconnected. Each succeeding group of four contacts are similarly interconnected. A diode 65 is connected between the first group and the second group to serve as a blocking diode and prevent current flow from the first group to the second group. Diodes are similarly connected between each of the succeeding groups of contacts.

The monetary display unit 41 includes a stepping switch MDU having ten fixed contacts and a moving arm, with the moving arm actuated by the solenoid MDS-1. In the system illustrated herein, the ten fixed contacts of MDU correspond to the monetary values zero through nine dollars. The second or one dollar contact is electrically connected to the first group of four contacts of the delivery stepper DS, the third or two dollar contact is connected to the second group of four contacts of DS, and the succeeding contacts of MDU are similarly connected to succeeding groups of DS.

Other conventional counter units, such as relay or transistor types, may be used for either or both of DS and MDU if desired. The functions of the remaining components of the system will readily be apparent from the description of operation which follows.

When the system is in the start position, ready to accept coins, the monetary display unit MDU is in the zero position. The first legend lamp 67 is energized from the A.C. line through RST and RFR. When the customer drops a one dollar token in the coin slot, coin switch CS is closed and energizes the one dollar add relay 1.00 AR, which in turn energizes MDS-1 and MDS-2. A resistor 68 is connected in series with the coil of 1.00 AR for current limiting purposes. Resistors are similarly used in conjunction with a number of other coils in the circuit. A capacitor 69 is charged from the DC source through a resistor 70 and CS. When CS is actuated by a coin, the capacitor 69 is discharged into the 1.00 AR coil to provide a pulse of energy for actuating the relay. Capacitors are used similarly in conjunction with a number of other relays in the circuit. Diodes 71 are connected in circuit with MDS-1 and MDS-2 for blocking purposes so that current of only one polarity flows in the circuit. Diodes are similarly used in conjunction with other relays in the circuitry.

When the dollar token is deposited, both monetary display units advance one step, positioning the numeral 1 at the openings 43, 45. The arm on MDU is moved from the zero position to the one dollar position. A bell is also energized through 1.00 AR to provide an audible signal to the customer. The customer may deposit additional dollar tokens to a total not to exceed nine dollars. As each additional token is deposited, the process is repeated to advance MDU one step. A coin count switch CCS is mounted on MDU and is opened after nine dollars have been deposited. When CCS is opened, the reject solenoid REJ in the coin handling unit 30 is de-energized to return to the customer any additional token deposited, since this particular system has a maximum capacity of nine dollars. Tokens are also returned when any of the normally closed tube empty switches PTE, NTE, QTE is opened, indicating that the supply of coins for refunds is depleted. The reset motor zero position switch RSMS-3 is in series with REJ, with RSMS-3 closed when RSM is stopped and open when RSM is running.

With the deposit of the first coin and activation of 1.00 AR, lamp 67 for the first legend is turned off and lamp 72 for the second legend is energized by operation of RST and ST, indicating to the customer that gasoline can be dispensed. Legend 2 instructs the customer to turn the handle 18. When the handle 18 is rotated to the on position, PCS-1 is closed and the flow meter 15 is reset to zero by the pump reset motor PRM. When resetting of the flow meter is completed, PCS-2 is closed to provide power to the valve solenoids V1, V2, and to the pump motor PM. Operation of PCR also turns off power to the legend 2 lamp 72. After placing the nozzle 17 in the tank of his automobile, the customer may operate the lever on the nozzle in the customary manner and gasoline flows through the system.

As gasoline is dispensed, the flow meter 15 registers the amount and the output shaft 20 drives the cams of the resolution unit 25. As cam A moves from its start or zero position, switch SZC is closed to energize the zero position relay ZPR, which in turn energizes the credit take-off relay CTO. Operation of CTO energizes DSA causing the delivery stepper DS to advance one step or one delivery unit. The cams on the resolution unit 25 make one full revolution for each delivery unit or 25 cents' worth of gasoline dispensed. Each revolution causes one operation of SZC and causes DS to advance one step.

A closed circuit between the moving arm of DS and the moving arm of MDU energizes the stop relay ST and the credit relay CR. This is a permissive circuit which allows gasoline to be dispensed. If one coin has been deposited, the MDU arm will be at the second contact or one dollar position. This permissive circuit will remain closed while DS moves through the first four steps. If two coins have been deposited, the circuit will remain closed through the first eight steps, and so forth for each additional coin deposited. When the delivery stepper DS moves one step beyond the corresponding point on MDU, this permissive circuit is interrupted and ST and CR are de-energized.

At this point in the cycle, cam A on the resolution unit 25 has moved past the zero position, SZC is closed providing power to ZPR, and gasoline flow continues, since gasoline flow is permitted as long as either ZPR or CR is energized. When a revolution of cam A is completed and the zero position is reached, SZC is opened and ZPR is de-energized. CR has already been de-energized and gasoline flow is stopped. Cam B closes switch SFC during the first 215° of each revolution. During any revolution when CR is de-energized and ZPR is energized, opening of SFC interrupts power to V1 to close one valve and cause a reduced rate of flow during the last ten cents' worth of delivery. When ZPR and CR are de-energized, the third legend lamp 73 is lighted.

The preceding description covers the operation of the system when the value of the gasoline delivered to the customer is the same as the value of the tokens deposited by the customer. When the value of the gasoline delivered is less than the value of the tokens deposited, the operation during delivery of gasoline is as described above, to the point where delivery is interrupted. For example, if the customer has deposited three tokens, MDU is at the fourth contact indicating three dollars. If delivery of gasoline is stopped by the customer or by the automatic shut-off in the nozzue, before the customer has received gasoline equal in value to three dollars, the system will refund the difference. After delivery is stopped, the nozzle is returned to its cradle and the handle 18 is turned to the off position, the refund portion of the system becomes operative. Suppose the customer has received gasoline of a value $1.37. DS will have stepped six times and be at the seventh contact, the permissive circuit through MDU and DS will be complete and ST and CR will be energized. The permissive circuit will not be broken until DS has stepped twelve times and reaches the thirteenth contact.

When the handle 18 is turned to the off position, PCS-1 is opened, de-energizing PCR and energizing the refund relay RFR which supplies power to the refund motor RFM. RFM drives a cam which actuates the refund motor switch RFMS. When as in the example being discussed, CR and RFR are energized when PCR is de-energized, actuating RFMS energizes the credit take off relay CTO to actuate DSA and advance DS one step. Actuation of CTO also energizes the quarter pay solenoid QPS to drop one 25 cent piece from the storage tube 35 into the receptacle 38. This pay out process is repeated until DS steps beyond its match point with MDU at which time ST and CR are de-energized. RFM continues to run until it arrives at its zero or start position at which time the carryover switch CO-3 is opened, RFR is de-energized and RFM stops.

In the example being discussed wherein three dollars in token was deposited and $1.37 in gasoline was delivered, RFM will cause DS to step six times to position 13, returning a quarter for each step, with a total of six quarters of $1.50. When ST is de-energized the penny, nickel pay relay PNP and the penny, nickel transfer relay PNT are enabled and relay POS is energized through CO–3 providing power to the motor 31 (MRU) of the resolution unit 25. The cams of the resolution unit stop in an intermediate position when gasoline flow is stopped. MRU continues to drive the cams in the same direction. Rotation of cam D operates the penny-pay switch PPC to energize the penny pay-out solenoid PPS, via a closed contact set on PNT. Each impulse to PPS results in a penny being paid out from the storage tube 37. This penny pay-out action is repeated until cam C actuates NPC. In the specific example being utilized, PPC would be actuated three times, refunding three pennies, and then NPC would be actuated. Actuation of NPC energizes PNT, opening the circuit to PPC and preventing further penny refunds. Energizing PNT also completes a circuit to the nickel pay-out solenoid NPS to refund a nickel from the storage tube 36. MRU continues to drive the cams and each time NPC is actuated, NPS is energized to refund another nickel. The cam rotation continues until the resolution unit returns to the zero or start position and SZC is actuated, de-energizing ZPR, MRU and PNP to prevent further refunds. In the specific example utilized, two nickels were refunded with a total refund comprising six quarters, three pennies and two nickels for a sum of $1.63.

Actuation of SZC also energizes the reset timer RST. After a delay built into the reset timer, typically eight to ten seconds, the contact sets of the reset timer are actuated to provide the resetting operation.

Actuation of RST after the delay time interval expires produces a number of functions which reset the system to the initial or start condition. The reset relay RSR is energized. The reset motor RSM is energized through the off zero switch OZ–3 on the monetary display unit actuated by MDS–1. RSM drives a cam which actuates reset motor cam switch RSMS ten times in a revolution to energize MDS–1 and MDS–2 for advancing both monetary display units to the zero or start position. When the monetary display unit 41 is at the zero position, the circuit to MDS–1 is opened at off zero switch OZ–1 and when the monetary display unit 44 is at the zero position, the circuit to MDS–2 is opened by off zero switch OZ–2. The circuit to RSM is opened by off zero switch OZ–3, but the motor is energized through a carry-over switch CO–1 which permits the motor to drive the cam to the zero or start position.

Actuation of RST and RSR also energizes DSB to return DS to the start position. The bell is energized via RSR to provide an audible signal indicating that reset has taken place. Lamp 73 for lengend 3 is turned off when PCR is de-energized. Lamp 67 for legend 1 is also energized by the actuation of RST, indicating to a customer that the system is ready for a new cycle of operation.

This apparatus will accept money or the equivalent in sales units of one dollar steps up to the maximum of nine dollars. The system delivers gasoline at a relatively high rate in dispensing units of 25 cents. After dispensing is completed, the system pays out a refund in dispensing units until they are used up. The system operates at a slower rate to pay out the remaining change in pennies and nickels. This arrangement permits accuracy in operation at the small change level while permitting gasoline delivery at the normal rates of operation. The magnitudes selected for the sales unit, dispensing unit and coin payouts are of course arbitrary and have been selected for use with the monetary system in the United States. Various alternatives are usable. In one variation, the dispensing unit can be made the same magnitude as the sales unit.

While the embodiment illustrated utilizes the deposit of a coin or token to operate the coin switch CS and initiate the registration of a sales unit, other mechanisms can be used to register a sales unit and the electrical function for registering a sales unit can be produced from a remote position if desired. When dispensing of gasoline is terminated, the position of the delivery stepper DS and the cams of the resolution unit provide a direct indication of the amount of gasoline dispensed. This information is utilized in the present system to control the pay out of money for a refund. The positions of these components could also be used to generate signals indicating the amount of gasoline dispensed for record purposes and could be used for paying out trading stamps or the like covering the amount purchased.

TABLE I

| Code: | Unit |
|---|---|
| CCS | Coin count switch on MDU. |
| CO–1 | Carry over switch on RSM. |
| CO–3 | Carry over switch on RFM. |
| CR | Credit relay. |
| CS | Coin switch. |
| CTO | Credit take off relay. |
| DS | Delivery stepper. |
| DSA | Delivery stepper coil A. |
| DSB | Delivery stepper coil B. |
| MDS–1 | Monetary display solenoid #1. |
| MDS–2 | Monetary display solenoid #2. |
| MDU | Monetary display unit. |
| MRU | Motor resolution unit. |
| NPC | Nickel payout switch (cam C). |
| NPS | Nickel payout solenoid. |
| NTE | Nickel tube empty switch. |
| OZ–1 | Off zero switch—MDS–1. |
| OZ–2 | Off zero switch—MDS–2. |
| OZ–3 | Off zero switch—MDS–1. |
| PCR | Pump control relay. |
| PCS–1 | Pump control switch #1. |
| PCS–2 | Pump control switch #2. |
| PM | Pump motor. |
| PNP | Penny, nickel pay relay. |
| PNT | Penny, nickel transfer relay. |
| POS | Payout safety relay. |
| PPC | Penny payout switch (cam D). |
| PPS | Penny payout solenoid. |
| PRM | Pump reset motor. |
| PTE | Penny tube empty switch. |
| QPS | Quarter payout solenoid. |
| QTE | Quarter tube empty switch. |
| RES | Coin reject solenoid. |
| RFM | Refund motor. |
| RFMS | Refund motor cam switch. |
| RFR | Refund relay. |
| RSM | Reset motor. |
| RSMS | Reset motor cam switch. |
| RSMS–3 | Reset motor zero position switch. |
| RSR | Reset relay. |
| RST | Reset timer. |
| SFC | Slow flow switch (cam B). |
| ST | Stop relay. |
| SZC | Subtract & zero position switch (cam A). |
| V1 | Valve solenoid #1. |
| V2 | Valve solenoid #2. |
| ZPR | Zero position relay. |
| 1.00 AR | $1.00 add relay. |

TABLE II

| Step: | Legend |
|---|---|
| 1 | Deposit coins. |
| 2 | Remove nozzle; turn red handle. |
| 3 | Return nozzle. |

We claim:
1. In a coin-operated fluid-dispensing system including pump, flow control valve means, flow meter and outlet nozzle, the combination of:
first register means for registering sales units;

means for receiving deposit signals denoting sales units and advancing said first register means a number of sales units corresponding to the deposit signals received;

means for opening and closing said valve means for dispensing fluid;

second register means for registering dispensing units as fluid is dispensed by the system;

third register means for registering fractions of a dispensing unit as fluid is dispensed by the system;

means interconnecting said first and second register means for generating a stop signal when there is a match in value of the registered units;

said means for closing said valve means being actuated automatically at the end of a dispensing unit after a stop signal is generated, and said means being manually actuable at any time said valve means is open;

coin storage means for coins of various denomination including fractions of sales units;

means for generating a refund signal when said valve means is closed as a result of manual actuation; and means for paying coins from said storage means in response to a refund signal as a function of the state of said third register means.

2. A system as defined in claim 1 in which said first register means includes a display unit providing a visual display of the state of said first register means while said second register means is registering dipensing units of fluid dispensed by the system.

3. A system as defined in claim 2 including:
means for receiving a plurality of coins and generating a deposit signal for each coin
reject means for rejecting coins; and
in which said first register means includes counting means for operating said reject means after a predetermined number of coins have been received.

4. A system as defined in claim 1 in which a dispensing unit is a fraction of a sales unit.

5. A system as defined in claim 1 in which said coin storage means includes coins of the lowest denomination in use and at least one multiple thereof, and in which said third register means registers in said lowest denomination and said multiple thereof.

6. A system as defined in claim 1 in which said means for paying includes means for paying coins from said storage means as a function of the difference in value of the registered units of said first and second register means.

7. A system as defined in claim 6 including means for advancing said second register means a dispensing unit each time coins equivalent to a dispensing unit are paid.

8. A system as defined in claim 6 in which said means for paying includes means for initiating payment as a function of the state of said third register means after there is a match in value of the registered units of said first and second register means.

9. A system as defined in claim 1 in which said third register means includes:
a plurality of switch means having a repeatable cycle corresponding to a dispensing unit;
means for actuating said plurality of switch means in synchronism and having first and second inputs;
means for connecting the flow meter as said first input;
a drive motor connected as said second input;
one of said switch means being actuable at the end of each of said cycles;
means for energizing said drive motor when a refund signal is received and said switch means are in an intermediate point in said cycle; and
means including said one switch means to stop said drive motor at the end of a cycle;
a second of said switch means actuating said means for paying when driven by said drive motor.

10. In a coin-operated fluid-dispensing system including pump, flow control valve means, flow meter and outlet nozzle, the combination of:
first register means for registering sales units;
means for receiving deposit signals denoting sales units and advancing said first register means a number of sales units corresponding to the deposit signals received;
means for opening and closing said valve means for dispensing fluid;
second register means for registering dispensing units as fluid is dispensed by the system;
third register means for registering fractions of a dispensing unit as fluid is dispensed by the system;
means interconnecting said first and second register means for generating a stop signal when there is a match in value of the registered units;
said means for closing said valve means being actuated automatically at the end of a dispensing unit after a stop signal is generated, and said means being manually actuable at any time said valve means is open;
coin storage means for coins of various denomination including fractions of sales units and coins of the lowest denomination in use and at least one multiple thereof, with said third register means registering in said lowest denomination and said multiple thereof;
means for generating a refund signal when said valve means is closed as a result of manual actuation; and
means for paying coins from said storage means in response to a refund signal as a function of the state of said third register means;
with said third register means including:
a plurality of switch means having a repeatable cycle corresponding to a dispensing unit;
means for actuating said plurality of switch means in synchronism and having first and second inputs;
means for connecting the flow meter as said first input;
a drive motor connected as said second input;
one of said switch means being actuable at the end of each of said cycles;
means for energizing said drive motor when a refund signal is received and said switch means are in an intermediate point in said cycle; and
means including said one switch means to stop said drive motor at the end of a cycle;
a second of said switch means being actuable at fractions of a cycle;
a third of said switch means being actuable at fractions of the fraction of said second switch means;
with said third switch means actuating said means for paying said coins of lowest denomination until said second switch means is actuated and with said second switch means actuating said means for paying said coins of one multiple, when driven by said drive motor.

11. A system as defined in claim 1 in which said third register means includes:
a plurality of cams mounted on a shaft for rotation with a revolution corresponding to a dispensing unit;
means for connecting the flow meter to drive said cam shaft;
a drive motor;
means for connecting said drive motor to said cam shaft;
a switch for operation by each cam;
one of said switches being actuable by one of said cams at the end of each revolution;
means for energizing said drive motor when a refund signal is received and said shaft is in an intermediate point in a revolution; and
means including said one switch to stop said drive motor at the end of a revolution;

a second of said switches being actuable by a second of said cams and actuating said means for paying when said shaft is driven by said drive motor.

12. In a coin-operated fluid-dispensing system including pump, flow control valve means, flow meter and outlet nozzle, the combination of:

first register means for registering sales units;
means for receiving deposit signals denoting sales units and advancing said first register means a number of sales units corresponding to the deposit signals received;
means for opening and closing said valve means for dispensing fluid;
second register means for registering dispensing units as fluid is dispensed by the system;
third register means for registering fractions of a dispensing unit as fluid is dispensed by the system;
means interconnecting said first and second register means for generating a stop signal when there is a match in value of the registered units;
said means for closing said valve means being actuated automatically at the end of a dispensing unit after a stop signal is generated, and said means being manually actuable at any time said valve means is open;
coin storage means for coins of various denomination including fractions of sales units;
means for generating a refund signal when said valve means is closed as a result of manual actuation; and
means for paying coins from said storage means in response to a refund signal as a function of the state of said third register means and including:
    means for paying coins from said storage means as a function of the difference in value of the registered units of said first and second register means;
    means for advancing said second register means a dispensing unit each time coins equivalent to a dispensing unit are paid; and
means for initiating further payment as a function of the state of said third register means after there is a match in value of the registered units of said first and second register means; and
with said third register means including:
    a plurality of switch means having a repeatable cycle corresponding to a dispensing unit;
    means for actuating said plurality of switch means in synchronism and having first and second inputs;
    means for connecting the flow meter as said first input;
    a drive motor connected as said second input;
    one of said switch means being actuable at the end of each of said cycles;
    means for energizing said drive motor when a refund signal is received and said switch means are in an intermediate point in said cycle; and
    means including said one switch means to stop said drive motor at the end of a cycle;
    a second of said switch means actuating said means for paying when driven by said drive motor.

References Cited

UNITED STATES PATENTS

| | | | |
|---|---|---|---|
| 2,754,950 | 7/1956 | Harris | 194—13 |
| 3,478,856 | 11/1969 | Bly | 194—13 |

STANLEY TOLLBERG, Primary Examiner

UNITED STATES PATENT OFFICE
CERTIFICATE OF CORRECTION

Patent No. 3,605,973  Dated September 20, 1971

Inventor(s) William F. Burke et al.  Page - 1

It is certified that error appears in the above-identified patent and that said Letters Patent are hereby corrected as shown below:

Column 1, line 11, "12 Claims" should read -- 15 Claims --. Column 4, line 52, "powdered" should read -- powered --. Column 5, line 52, "token" should read -- tokens --. Column 6, line 47, "nozzue" should read -- nozzle --; line 53, after "value" insert -- of --. Column 7, line 1, "token" should read =-- tokens --; line 4, "of" should read -- or --; line 54, "lengend" should read -- legend --. Claim 3, line 3, the "; and" is omitted. Claims 13, 14 and 15 have been omitted from printed patent and should read:

13. In a coin-operated fluid-dispensing system including pump, flow control valve means, flow meter, outlet nozzle, a first register for registering sales units, and a valve control for opening and closing the valve means for dispensing fluid, the improvement comprising in combination:

a second register for registering dispensing units as fluid is dispensed by the system at a relatively high rate;

a third register for registering fractions of a dispensing unit as fluid is dispensed by the system;

means interconnecting said first and second registers for generating a stop signal when there is a match in value of the registered units;

UNITED STATES PATENT OFFICE
CERTIFICATE OF CORRECTION

Patent No. 3,605,973    Dated September 20, 1971

Inventor(s) William F. Burke et al.    Page - 2

It is certified that error appears in the above-identified patent and that said Letters Patent are hereby corrected as shown below:

with said valve control closing said valve means automatically at the end of a dispensing unit after a stop signal is generated, and said valve control being manually actuable at any time said valve means is open;

coin storage means for coins of various denomination including fractions of sales units;

means for generating a refund signal when said valve means is closed as a result of manual actuation;

means for paying coins from said storage means in response to a refund signal as a function of the state of said third register means; and means for registering fractions of a dispensing unit at said third register as coins are paid corresponding to said fractions at a relatively low rate.

UNITED STATES PATENT OFFICE
CERTIFICATE OF CORRECTION

Patent No. 3,605,973     Dated September 20, 1971

Inventor(s) William F. Burke et al.     PAGE - 3

It is certified that error appears in the above-identified patent and that said Letters Patent are hereby corrected as shown below:

14. In a coin-operated fluid-dispensing system including pump, flow control valve means, flow meter and outlet nozzle, the combination of:

first register means for registering sales units;

means for opening and closing said valve means for dispensing fluid;

second register means for registering dispensing units as fluid is dispensed by the system;

third register means for registering fractions of a dispensing unit as fluid is dispensed by the system;

means interconnecting said first and second register means for generating a stop signal when there is a match in value of the registered units;

said means for closing said valve means being actuated automatically at the end of a dispensing unit after a stop signal is generated, and said means being manually actuable at any time said valve means is open;

means for developing control signals indicating the state of said second register means and of said third register means when said valve means is closed; and     means actuated by said control signals for driving said second register means to a match in value of the registered units and for driving said third register means to a zero state.

UNITED STATES PATENT OFFICE
CERTIFICATE OF CORRECTION

Patent No. 3,605,973            Dated September 20, 1971

Inventor(s) William F. Burke et al.     PAGE - 4

It is certified that error appears in the above-identified patent and that said Letters Patent are hereby corrected as shown below:

15. In a coin-operated fluid-dispensing system including pump, flow control valve means, flow meter and outlet nozzle, the combination of:

means for receiving deposit signals denoting sales units and for receiving dispensing signals denoting dispensing units as fluid is dispensed by the system and generating a stop signal when there is a match in value of the deposit and dispensing signals;

means for opening and closing said valve means for dispensing fluid;

a paying register for registering fractions of a dispensing unit as fluid is dispensed by the system;

said means for closing said valve means being actuated automatically at the end of a dispensing unit after a stop signal is generated, and said means being manually actuable at any time said valve means is open;

UNITED STATES PATENT OFFICE
CERTIFICATE OF CORRECTION

Patent No. 3,605,973            Dated September 20, 1971

Inventor(s) William F. Burke et al.          PAGE - 5

It is certified that error appears in the above-identified patent and that said Letters Patent are hereby corrected as shown below:

coin storage means for coins of various denomination including fractions of sales units;

means for generating a refund signal when said valve means is closed as a result of manual actuation; and     means for paying coins from said storage means in response to a refund signal as a function of the state of said paying register.

Signed and sealed this 11th day of April 1972.

(SEAL)
Attest:

EDWARD M. FLETCHER, JR.          ROBERT GOTTSCHALK
Attesting Officer                 Commissioner of Patents